Nov. 30, 1965 C. L. EADS 3,221,289

PRINTED CIRCUIT CONNECTOR

Filed Jan. 20, 1964 3 Sheets-Sheet 1

INVENTOR.
CHARLES L. EADS
BY Naylor & Neal
ATTORNEYS

Nov. 30, 1965 C. L. EADS 3,221,289

PRINTED CIRCUIT CONNECTOR

Filed Jan. 20, 1964 3 Sheets-Sheet 2

INVENTOR.
CHARLES L. EADS

BY Naylor & Neal

ATTORNEYS

INVENTOR.
CHARLES L. EADS
BY Naylor & Neal
ATTORNEYS

United States Patent Office 3,221,289
Patented Nov. 30, 1965

3,221,289
PRINTED CIRCUIT CONNECTOR
Charles L. Eads, North Hollywood, Calif., assignor to Eads Connector Corporation, San Francisco, Calif., a corporation of California
Filed Jan. 20, 1964, Ser. No. 338,639
18 Claims. (Cl. 339—176)

This invention relates to electrical connectors and more particularly to connectors for connecting a plurality of electrical terminals to a printed circuit board.

In my copending application, Serial No. 223,927 filed Sept. 17, 1962, I have disclosed a new type of printed circuit connector in which the electrical terminals are locked into the connector automatically as a printed circuit board is inserted into the connector. The present application involves improvements on my earlier connector whereby several advantages may be obtained with my earlier connector as well as with other connectors in which these improvements may be incorporated.

The automatic terminal locking, mentioned above, was obtained in the structure shown in my earlier application by the provision of rocker arms extending through the connector where the insertion of a printed circuit board into the connector moved the rocker arms to locking positions with the rocker arms mechanically locking electrical terminals in the connector. The rocker arms were made of a dielectric material and were overlaid with an electrical conductor which connected the terminals electrically to the printed circuit board.

In accordance with the present invention, I have provided a novel metal spring beam which may be employed in place of the dielectric rocker arms and electrical conductors shown in my earlier application. These new metal beams provide a number of advantages in the connector above and beyond the simple advantage of amalgamating the two earlier parts, rocker and conductor, into a single new part.

The metal beam permits the connector to be constructed with an improved degree of control over the structural relations between the parts of the connector. The beam provides a minimum latching force holding terminals in the connector before a printed circuit board is inserted. This minimum latching force may be well below the latching force which must hold the terminals in place during use, and reduction of this minimum latching force permits any one terminal to be inserted and withdrawn from the connector many times (incident to programming changes and the like) without any substantial wear on the terminal or on special metal coatings. The minimum latching force can be controlled to provide any desired minimum degree of latching between the terminals and the connector so that the terminals are effectively held in place during assembly of an electrical instrument while permitting individual terminals to be changed easily.

The metal beam provides a locking of the terminals to the connector as a printed circuit board is inserted into the connector so that the minimum latching force is supplemented by a large further locking force which absolutely prevents the terminals from coming out of the connector while the circuit board is present in the connector. When the circuit board is subsequently removed, the terminals can be changed again very easily, but as long as the circuit board is in place, the terminals cannot come out of the connector even where the connector and terminals are subjected to severe vibration, acceleration forces, and the like.

Rigidity is provided in the metal beam by incorporating into the beam a metal flange which lies in a plane along which the beam must withstand stress. This flange may be in the form of a web, curved rib, or the like, but the flange provides structural reinforcing of thin metal stock so that the beam may be formed of folded sheet metal or the like. With this beam construction, the flexibility of the beam can be altered in certain areas by reducing the dimensions of the flange in those areas to adapt the connector to printed circuit boards of different thicknesses and the like.

A plurality of metal beams can be mounted in a single connector body for either joint or individual removal so that all or one of the beams can be removed for reassembly or repair of the connector.

The metal beams are readily useable with electrical solderless terminals which may be plugged into the connector very simply with one or more terminals connected to each conductor strip on a printed circuit board, and these terminals are asexual in that they may be plugged into any terminal socket in the connector without regard to terminal orientation.

The terminals may be attached to wire leads by conventional crimp tools, and the terminals may be inserted and withdrawn from the connector without the use of any tools at all. Other features and advantages of the invention will become apparent from the following description of a specific embodiment thereof read in conjunction with the attached drawings in which.

Figure 1:
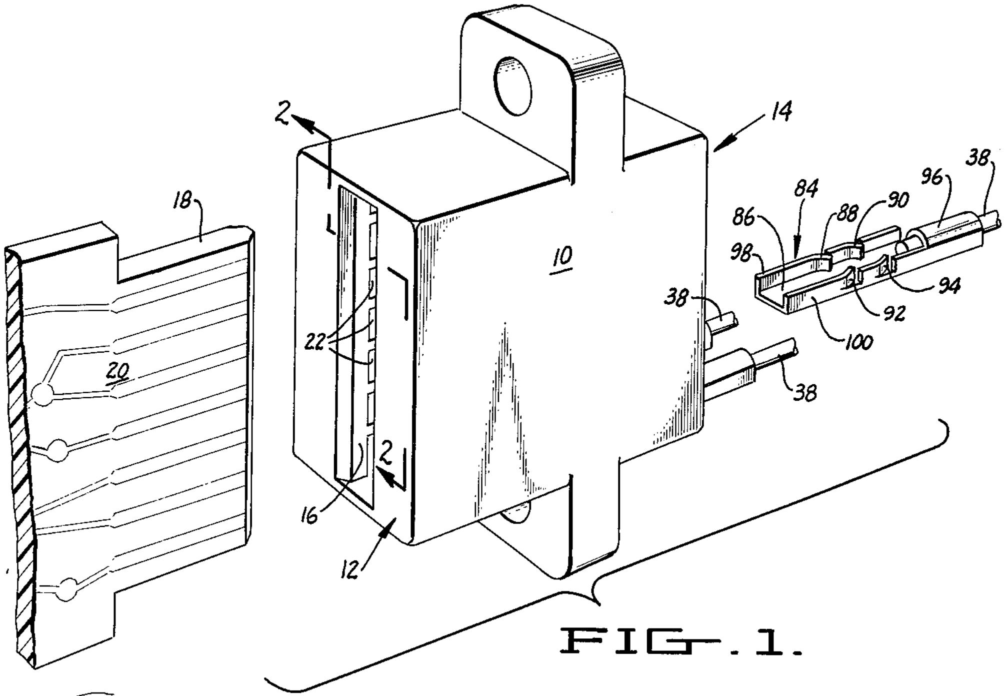
FIG. 1 is a perspective view of a small printed circuit connector constructed in accordance with the principles of this invention.
Figure 2:
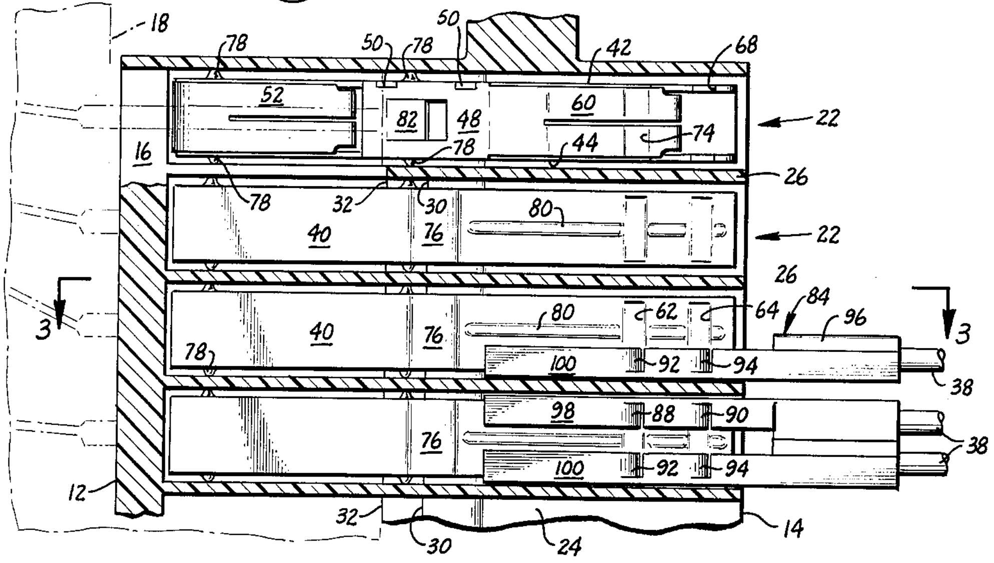
FIG. 2 is a sectional view of the connector of FIG. 1 taken along the bifurcated plane indicated at 2—2 in FIG. 1.

Referring now in detail to the drawings and particularly to FIG. 1, the printed circuit connector of this invention includes a body 10 made of dielectric material and having first and second ends 12 and 14 respectively. An elongated central cavity 16 is provided in the first end 12 of the connector body for receipt of the edge 18 of a printed circuit board 20.

Figure 3:
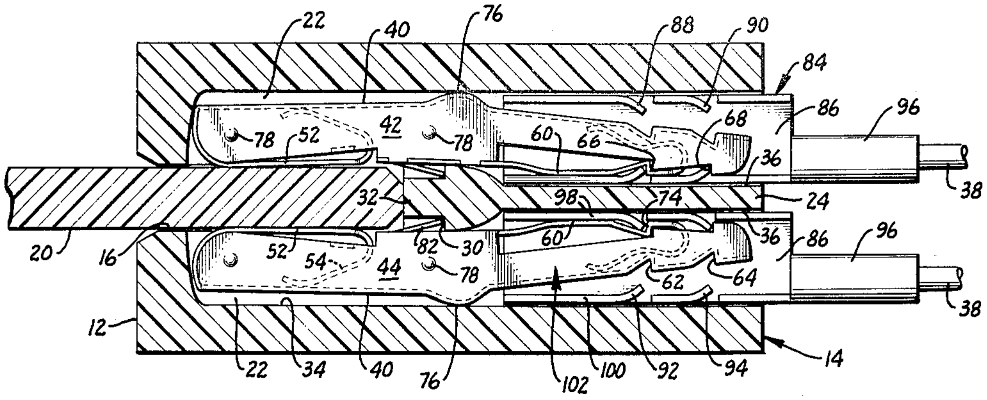
FIG. 3 is a cross sectional view of the connector of FIG. 1 taken along the plane indicated at 3—3 in FIG. 2 and showing a printed circuit board in place in the connector with the terminals locked in the connector.
Figures 4, 5:
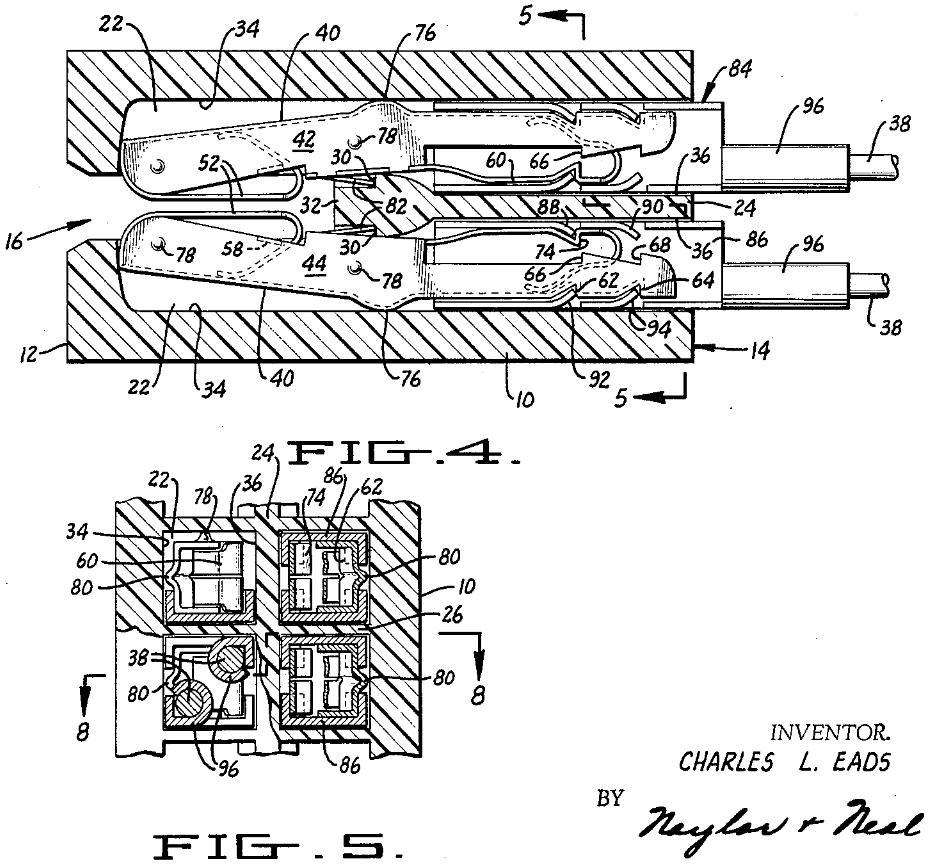
FIG. 4 is a sectional view similar to FIG. 3 showing the printed circuit board removed and the terminals unlocked.
FIG. 5 is a sectional view of the connector taken along the plane indicated at 5—5 in FIG. 4.

A plurality of outer cavities 22 (FIGS. 2–5) are provided in the second end 14 of the connector body with the outer cavities 22 provided on opposite sides of a central plane through the center cavity 16 as illustrated in FIG. 4 with the outer cavities opening into the central cavity 16. The outer cavities 22 are arranged in pairs on opposite sides of the central plane of the connector as illustrated in FIG. 5 with a plurality of pairs of cavities provided side by side along the length of the connector body. The outer cavities 22 of each pair are separated by a central web 24 in the connector body, and adjacent pairs of cavities 22 are separated by transverse walls 26. For reasons explained below, the web 24 between the cavities 22 of each pair is provided with a shoulder 30 facing into the central cavity 16 adjacent to each of the outer cavities 22 with the two shoulders 30 separated by a boss 32. Each of the outer cavities 22 has an outer wall 34 generally parallel to the center plane of the connector body and an inner wall 36 facing away from the center plane of the body adjacent to the end 14 thereof.

Figures 6, 7:
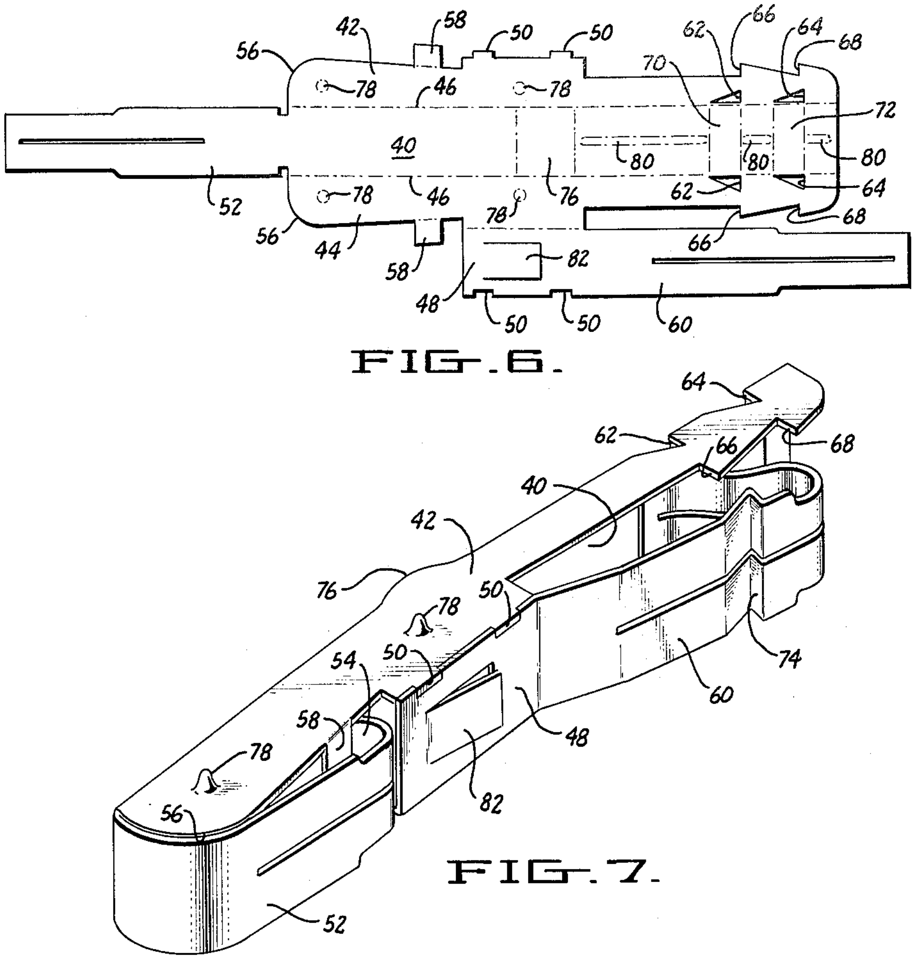
FIG. 6 is a plan view of a metal stamping from which the spring metal beam employed in the connector is made.
FIG. 7 is a perspective view of the spring beam made from the stamping of FIG. 6.

A spring beam (FIG. 7) is mounted in each of the outer cavities 22 for connecting a contact on the printed circuit board 20 to an electrical terminal wire 38. The spring beam is formed of a folded sheet of metal which may be pre-stamped into a blank as illustrated in FIG. 6. With reference to FIGS. 6 and 7, each of the spring beams has a web portion 40 on which is mounted a pair of flanges 42 and 44 which are joined to the web 40 at elongated fold lines 46. The flanges 42 and 44 are positioned substantially perpendicular to the web 40 so that the flanges lie substantially perpendicular to the center plane of the connector body when the spring beams are positioned in the outer cavities 22; in this way, the flanges 42 and 44 impart to the spring beam substantial strength to withstand forces in planes perpendicular to the center plane.

The beam flange 44 carries a web portion 48 which is folded over and joined to the flange 42 by ears and slots 50 thereby supporting the central portions of the two flanges with respect to each other.

Figure 8:
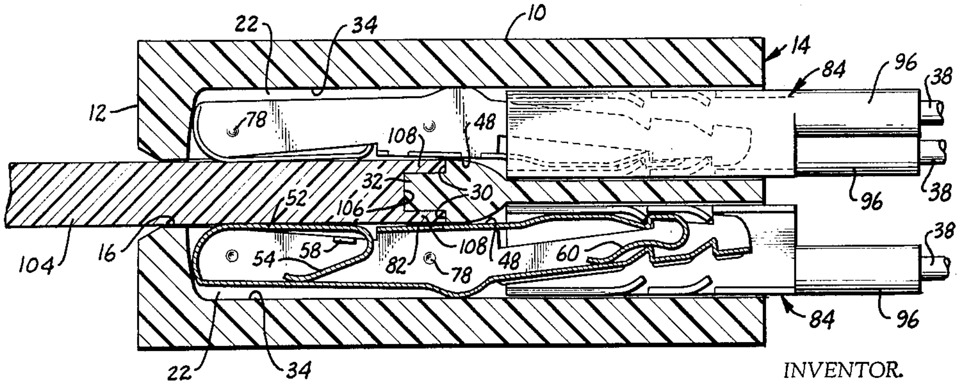
FIG. 8 is a sectional view similar to FIG. 3 but showing a removal tool inserted into the connector to facilitate removal of the spring beams, FIGS. 2, 3, 4, 5, and 8 being shown to scale with the connector illustrated approximately four times its actual size.

One end of the web portion 40 carries a slotted printed circuit board contact portion 52 which is wrapped around the forward end of the flanges 42 and 44 and folded back into the space within the beam as indicated at 54 in FIG. 8. It should be noted that the width of the printed circuit board contact potrion 52 is sufficiently great that this contact portion is supported on its under sides by the forward curved edges 56 of the flanges 42 and 44. This supporting arrangement provides a rigid contact portion on the forward end of the spring beam where the spring beam engages a printed circuit board. A pair of ears 58 are provided on the flanges 42 and 44, and the ears are bent inwardly as shown in FIGS. 7 and 8 to engage the inwardly bent portion 54 and thereby prevent the printed circuit board contact portions 52 of two opposed beams from electrically contacting each other when a printed circuit board is removed from between them (this arrangement is illustrated in FIG. 4).

An electrical terminal contact portion 60 is mounted on the web 48 and is folded into the space between the flanges 42 and 44. In this way, the electrical terminal contact portion 60 and the printed circuit contact portion 52 are provided with resilient support in the spring beam for resiliently engaging the electrical components to which they are to be connected.

The spring beam is provided with a plurality of latching detents on its end adjacent to the end 14 of the printed circuit body. These latching detents are provided by shoulders 62, 64, 66 and 68 on each of the flanges 42 and 44 together with coined-out portions 70 and 72 respectively which extend between the shoulders 62 and shoulders 64 respectively. The electrical terminal contact portion 60 is also provided with a coined-out portion 74 which fits into engagement with the shoulders 66 when the contact portion 60 is resiliently compressed into the spring beam.

The web 40 of the spring beam is provided with a coined-out bearing area 76 between the contact portions 52 and 60, and spacer projections 78 are provided on the flanges 42 and 44 for laterally positioning each of the beams in its cavity 22. As will become apparent hereinafter, an elongated coined-out rib 80 is provided along the web 40 for spacing the web 40 from the outer wall 34 of the cavity 22; this rib limits rocking motion of the beams as shown in FIG. 4 to prevent electrical connection between a pair of opposed beams, and at the same time provide clearance between the rearward end of the web 40 and outer wall 34 of the cavity to facilitate insertion of electrical terminals into the cavity. A spring finger 82 is provided on the web portion 48 for locking each of the spring beams into the connector body.

After the connector body 10 has been formed by molding or the like, the spring beams may be simply inserted into the cavities 22 from the end 14 of the body. This insertion progresses until the spring fingers 82 latch onto the shoulders 30 to lock the spring beams into the cavity. When the spring beams are thus positioned, the terminal contact portions 60 resiliently urge the right hand ends of the beams as viewed in FIG. 4 outwardly into engagement with the outer walls 34 of the cavities 22, and the spacer ribs 80 engage the cavity walls and prevent the printed circuit board contact portions 52 of a pair of beams from electrically contacting each other. It will be noted in FIGS. 3 and 4 that a pair of beams thus supported in a pair of opposed cavities 22 engage the outer cavity walls 34 with their bearing areas 76 so that the two beams rock on their bearing areas from the FIG. 4 position to the FIG. 3 position responsive to the insertion of a printed circuit board 20 into the cavity 16.

The connector is provided with a plurality of electrical terminals 84 (FIG. 1) which connect the electrical wires 38 to the spring beams. Each of the terminals has a central web portion 86 and four latch detents in the form of coin-outs or punch-outs 88, 90, 92 and 94 which engage the beam latches 62–68 as explained hereinafter. Each of the terminals 84 has a wire crimp socket 96 which may be crimped onto the wire 38 by a conventional crimping tool.

When the connector is to be used to connect a plurality of terminal wires 38 to a printed circuit board 20, one of the terminals 84 is attached to each of the wires 38 and then one or two of the terminals 84 is inserted into each of the cavities 22 as shown in FIGS. 4 and 5. When two terminals are inserted into a single cavity, the terminal webs 86 of the two terminals lie on opposite sides of the spring beam generally perpendicular to the center plane of the connector while the terminal flanges 98 and 100 which carry the terminal latches 88–94 resiliently compress the spring beam between them. In this condition, each terminal is temporarily latched into the connector by engagement of three latches on opposite sides of the spring beam. As indicated in FIG. 4, the latch detents 62 and 64 on one side of the spring beam engage latch detents 92 and 94 on one flange of the terminal while the latch detent 74 on the terminal contact portion 60 engages the latch detent 88 on the opposite flange of the terminal. With the terminal thus supported on the spring beam, the resiliency of the terminal contact portion 60 urges these three latches into seating engagement while permitting the terminal to be pulled out of the cavity 22 without any substantial damage to the latches; as the terminal is pulled out of the cavity, the spring beam resiliently compresses to release the three latches.

When all of the terminals are in place in the cavities 22, the printed circuit board 20 may be inserted into the central cavity 16 to complete the circuit and concurrently lock all of the terminals into the connector. When the printed circuit board is inserted, it engages the circuit board contact portions 52 and rocks the beams on their support areas 76 from the FIG. 4 position to the FIG. 3 position. During this rocking motion, the beam latch detents 62 and 64 move out of engagement with the terminal latch detents 92 and 94, and the beam latch detents 68 and 66 move into positive mechanical locking relation with the latch detents 88 and 90 on the terminal. The beam latch portion 68 moves into direct locking contact with the latch 90 on the terminal, and the beam latch 66 moves into engagement with the latch detent 74 on the terminal contact portion 60 to physically backup the detent 74 and prevent its disengagement from the terminal latch 88. With the parts of the connector arranged in this way as illustrated in FIG. 3, the electrical terminals are positively locked in the connector body and may be subjected to very high forces and vibration while they maintain efficient electrical contact with the printed circuit board.

With reference to FIGS. 3 and 7, it will be noted that the flanges 42 and 44 of the spring beam have a greater width on the right hand side of the bearing area 76 than they do on the left hand side; that is, the flanges are smaller between the bearing area 76 and the end 14 of the terminal body then they are between the bearing area 76 and the end 12 of the body. This differential proportioning of the flanges is intentionally provided to introduce limited flexibility into the flanges in the area indicated by arrow 102, and this flexibility adapts the connector for use with printed circuit boards of different thickness. Thus, the spring beam is designed for a printed circuit board of minimum thickness, and the outer surface of the beam at its ribs 80 (FIG. 5) engage the outer wall 34 of the cavities. When a board of minimum thickness is inserted into the connector, the two spring beams rock through a sufficient angle that the latch portions 66 and 68 move into positive locking relation with the terminal. If the printed circuit board which is used with the terminal has a thickness substantially exceeding the minimum thickness, each of the spring beams will flex at the area 102 to permit insertion of the printed circuit board while maintaining rigid locking of the terminals in the connector.

When it is desirable to remove one or more of the spring beams from the connector, this removal can be accomplished very easily as illustrated in FIG. 8. It will be recalled that the spring beams are locked into the terminal body by engagement of the spring fingers 82 with the shoulders 32 on opposite sides of boss 30. These spring fingers may be released by inserting into the cavity 16 a beam removing tool 104 having the form of a printed circuit board with a slot 106 in its leading edge. The slot 106 forms a pair of fingers 108 on the tool in longitudinal alignment in the cavity 16 with the shoulders 32 so that as the tool is inserted into the cavity, it engages the spring fingers 82 and depresses them into the spring beams while the slot 106 receives the boss 30. With the spring fingers 82 thus depressed, the terminals 84 may be pulled from the cavities 22, and since the terminals are locked onto the spring beams, the spring beams will be pulled from the cavities with them.

While one specific embodiment of this invention has been illustrated and described in detail herein, it is obvious that many modifications thereof may be made without departing from the spirit and scope of the invention.

I claim:

1. In a printed circuit board connector comprising an insulator body having first and second cavities therein adapted to receive a printed circuit board and an electrical terminal respectively electrically connected together, and a rocker mounted in said body and extending into said first and second cavities with said rocker mounted for pivotal movement from an unlocking position to a locking position responsive to insertion of a printed circuit board into said first cavity, where said rocker has a portion thereof movable in said second cavity for positively locking an electrical terminal in said second cavity as said rocker moves to said locking position, the improved rocker comprising a folded sheet of metal having an elongated web portion and an elongated flange joined to said web along a fold line extending along the length of said web with said web and flange forming a beam rockably mounted in said body and extending into said first and second cavities, and electrical contact portions on opposite ends of said beam facing in directions generally perpendicular to the adjacent portions of said web with said contact portions positioned in said cavities to engage a printed circuit board and an electrical terminal, an electrical terminal removably mounted in said second cavity with said terminal having a terminal web portion generally parallel to said flange and a pair of flanges mounted on said terminal web portion on opposite sides of said beam, the contact portion on said beam which is positioned in said second cavity being resiliently mounted on said beam spring biased away from said web, and said flanges on said terminal having latch detents in latching engagement with said web and said contact portion latching said beam and terminal together when said rocker is in said unlocking position while permitting said beam and terminal to be pulled apart in opposition to the spring bias on said contact portion.

2. In a printed circuit board connector comprising an insulator body having first and second cavities therein adapted to receive a printed circuit board and an electrical terminal respectively electrically connected together, and a rocker mounted in said body and extending into said first and second cavities with said rocker mounted for pivotal movement from an unlocking position to a locking position responsive to insertion of a printed circuit board into said first cavity, where said rocker has a portion thereof movable in said second cavity for positively locking an electrical terminal in said second cavity as said rocker moves to said locking position, the improved rocker comprising a folded sheet of metal having an elongated web portion and an elongated flange joined to said web along a fold line extending along the length of said web with said web and flange forming a beam rockably mounted in said body and extending into said first and second cavities, and electrical contact portions on opposite ends of said beam facing in directions generally perpendicular to the adjacent portions of said web with said contact portions positioned in said cavities to engage a printed circuit board and an electrical terminal, an electrical terminal removably mounted in said second cavity with said terminal having a terminal web portion generally parallel to said flange and a pair of flanges mounted on said terminal web portion on opposite sides of said beam, one of said flanges on said terminal engaging one of said contact portions on said beam, a latch member provided on said one flange facing toward said beam, and a second latch member provided on said beam facing toward said first latch member and movable into engagement with said first latch member responsive to rocking of said beam from said unlocking position to said locking position.

3. In a printed circuit connector for connection to a printed circuit board which comprises an insulator body having first and second cavities therein for receiving a printed circuit board and a plurality of electrical terminals respectively with the terminals electrically connected to the board, a plurality of electrical terminals removably inserted in said second cavity, and normally unlocked manually operable locking means in said body for simultaneously locking all of said terminals in said second cavity, the improvement comprising a latch detent on each of said terminals, latch means mounted in said body adjacent to the latch detent on each of said terminals and locked in said body against withdrawal from said body through said second cavity, and spring means resiliently biasing said latch means and said latch detent into latching relation with each other for resiliently latching said terminals in said body when said locking means is unlocked while permitting said terminals to be pulled from said second cavity when said locking means is unlocked.

4. In a printed circuit board connector comprising an insulator body having first and second cavities therein adapted to receive a printed circuit board and an electrical terminal respectively electrically connected together, a terminal mounted in said second cavity with a terminal lock portion thereon, and a rocker mounted in said body and extending into said first and second cavities with said rocker mounted for pivotal movement from an unlocking position to a locking position responsive to insertion of a printed circuit board into said first cavity, where said rocker has a portion thereof movable in said second cavity into locking relation with said terminal lock portion for positively locking said electrical terminal in said second cavity as said rocker moves to said locking position, the improvement comprising a first latch portion on said terminal, a second latch portion on said rocker, and spring means forming a portion of said rocker resiliently biasing said second latch portion into latching engagement with said first latch portion when said rocker is in said unlocking position for resiliently latching said terminal in said second cavity when said rocker is in said unlocking position while permitting said terminal to be pulled from said second cavity.

5. A printed circuit connector comprising
- A. a body of dielectric material having
  1. a first elongated cavity therein adapted to receiving the edge of a printed circuit board and
  2. a plurality of second cavities therein each communicating with said first cavity and each adapted to receive an electrical terminal,
- B. an electrical terminal removably mounted in each of said second cavities with each of said terminals having a latch detent portion and a terminal lock portion,
- C. a metal beam mounted in each of said second cavities with each of said beams having
  1. a first contact portion in said first cavity positioned for electrical contact with a printed circuit board inserted into said first cavity,
  2. a second contact portion in said second cavity having a latch detent in resilient engagement with said latch detent portion of the terminal in said cavity for resiliently holding said terminal in said cavity while permitting said terminal to be pulled from said cavity, and
  3. a beam lock portion facing toward but spaced away from said terminal lock portion, and
- D. positioning means in said body engaging said beams and positioning each of said beams with its first contact portion in the path of motion into said first cavity of a printed circuit board with said positioning means supporting each of said beams in said body for rocking movement to move said beam lock portion into locking relation with said terminal lock portion responsive to insertion of a printed circuit board into said first cavity.

6. A printed circuit connector comprising:
- A. a body of dielectric material having
  1. first and second ends and a generally central plane extending between said ends,
  2. a central cavity extending into said body from said first end along said central plane and adapted to receive the edge of a printed circuit board, and
  3. a pair of outer cavities extending into said body from said second end and communicating with said central cavity with said outer cavities positioned on opposite sides of said central plane and having inner wall portions facing away from said central plane and outer wall portions facing toward each other across said central plane,
- B. an electrical terminal removably mounted in each of said outer cavities with each of said terminals having a metal portion with a terminal latch detent therein contacting said inner wall, and
- C. a metal beam mounted in each of said outer cavities and having
  1. a flange extending longitudinally of said outer cavity generally perpendicular to said central plane for rendering said beam substantially rigid in a plane perpendicular to said central plane,
  2. a terminal contact portion facing toward said central plane and resiliently mounted on said flange for engaging said terminal adjacent to said inner wall while resiliently urging said flange toward said outer wall,
  3. a beam latch detent on said flange facing toward said central plane and said terminal latch detent but spaced away from said terminal latch detent,
  4. a printed circuit board contact portion on said flange and extending into said central cavity in the path along which a printed circuit board is inserted into said central cavity, and
  5. a bearing portion on said flange between said beam latch detent and said printed circuit board contact portion with said bearing portion engaging said outer wall of said outer cavity and supporting said beam on said outer wall for rocking motion to move said beam latch detent toward said central plane and into locking relation with said terminal latch detent responsive to insertion of a printed circuit board into said central cavity.

7. The printed circuit connector of claim 6 in which each of said beams has a support area on the side of said bearing area opposite to said printed circuit board contact portion; said support area is resiliently held in contact with said outer wall of said outer cavity by said terminal contact portion, and said support areas of said pair of beams support said beams with their printed circuit board contact portions out of contact with each other.

8. The printed circuit connector of claim 6 in which said flange has a first portion between said bearing area and said printed circuit contact portion and a second portion between said bearing area and said beam latch detent, and the height of said second portion measured perpendicular to said central plane is less than the height of said first portion measured perpendicular to said central plane.

9. The printed circuit connector of claim 6 in which said terminal in each of said outer cavities has a web portion generally parallel to said flange and a pair of terminal flanges one adjacent to each of said inner and outer walls of said outer cavity, and said beam is resiliently mounted between said pair of flanges of said terminal.

10. The printed circuit connector of claim 9 characterized further by the inclusion of a terminal detent on each of said terminal flanges, and complementary beam detents on said beam flange and said terminal contact portion engaging said terminal detents for resiliently holding said terminal in said outer cavity when said terminal latch detent and beam latch detent are unlocked from each other.

11. The printed circuit connector of claim 9 characterized further in that the flanges on said terminal in one of said outer cavities extend across the beam in said cavity for a distance which is less than the width of said beam, and a second identical terminal is mounted in said one outer cavity with said two terminals having terminal web portions on opposite sides of the beam parallel to said beam flange and terminal flanges on each terminal extending across the beam toward the other terminal generally perpendicular to said beam flange.

12. The printed circuit connector of claim 6 characterized further in that a shoulder is provided in said body perpendicular to the length of said beam and facing into said central cavity adjacent to each of said outer cavities; a spring finger is mounted on each of said beams in said central cavity with said spring finger having a free end engaging one of said shoulders for locking said beam against movement in said outer cavity in a direction toward said second end of said body, and a boss is provided between said spring fingers for preventing a printed circuit board in said central cavity from engaging said fingers.

13. The connector of claim 12 characterized further by the inclusion of a beam removal tool in said central cavity with said tool having a pair of tool fingers in longitudinal alignment in said central cavity with said shoulders, said tool having a slot between said tool fingers for receiving said boss whereby said tool fingers may be moved into engagement with said shoulders to release said spring fingers from said shoulders and permits said beams to be withdrawn from said body through said outer cavities.

14. The connector of claim 6 in which each of said beams comprises a folded sheet of metal having an elongated web portion adjacent to the outer wall of the outer cavity in which said beam is mounted and a pair of said beam flanges joined to said web along fold lines extending longitudinally of said outer cavity at opposite sides of said web with said flanges extending from said web toward said central plane generally perpendicular to said central plane with said contact portions resiliently mounted on opposite ends of said web at fold lines extending generally parallel to said central plane.

15. A printed circuit connector comprising:

A. a body of dielectric material having
   1. first and second ends and a generally central plane extending between said ends,
   2. a central cavity extending into said body from said first end along said central plane and adapted to receive the edge of a printed circuit board, and
   3. a pair of outer cavities extending into said body from said second end and communicating with said central cavity with said outer cavities positioned on opposite sides of said central plane and each having a pair of opposed parallel walls extending into said body from said second end, B. an electrical conductor mounted in each of said outer cavities and extending into said central cavity for electrical connection to a printed circuit board in said central cavity with each of said conductors having
   1. two metal strip portions one adjacent to each of said opposed parallel walls of said cavity,
   2. with said two metal strip portions resiliently connected together for resilient expansion apart from each other into resilient engagement with said opposed parallel walls, and
   3. a latch detent on at least one of said metal strip portions, and C. an electrical terminal mounted in each of said outer cavities with each of said terminals having
   1. a terminal web portion extending between said opposed parallel walls generally perpendicular to said opposed parallel walls,
   2. a pair of flange portions on said web portion and extending along said opposed parallel side walls with said metal strip portions resiliently compressed between said flange portions, and
   3. a latch detent on at least one of said flanges in latching engagement with said latch detent on one of said strip portions.

16. The connector of claim 15 characterized further in that a latch detent is provided on each of said metal strip portions, and a latch detent is provided on each of said flanges in latching engagement with a latch detent on one of said strip portions.

17. The connector of claim 15 characterized further in that a pair of said electrical terminals are mounted in one of said outer cavities with said terminals being identical to each other with said flanges on each of said terminals extending over about one-half of the width of said side wall portions.

18. A printed circuit connector comprising:

A. a body of dielectric material having
   1. first and second ends and a generally central plane extending between said ends,
   2. a central cavity extending into said body from said first end along said central plane and adapted to receive the edge of a printed circuit board,
   3. a pair of outer cavities having straight side walls into said body from said second end and communicating with said central cavity with said outer cavities positioned on opposite sides of said central plane and adapted to receive electrical terminals to be connected to a printed circuit board, and
   4. a shoulder on said body facing into said central cavity adjacent to each of said outer cavities with a boss on said body between said shoulders, B. an electrical conductor mounted in each of said outer cavities and having
   1. a terminal connection portion adjacent to said second end adapted to be electrically connected to an electrical terminal,
   2. a printed circuit board connection portion in said cavity for electrically contacting a printed circuit board, and
   3. a spring finger having a free end engaging one of said shoulders for preventing movement of said conductor out of said cavity in a direction toward said second end, and C. a conductor removal tool in said central cavity with said tool having a pair of tool fingers in longitudinal alignment in said central cavity with said shoulders, said tool having a slot between said tool fingers for receiving said boss whereby said tool fingers may be moved into engagement with said shoulders to release said spring fingers from said shoulders to permit said electrical conductors to be withdrawn from said outer cavities through said second end of said body.

References Cited by the Examiner

UNITED STATES PATENTS

| | | | |
|---|---|---|---|
| 2,664,734 | 1/1954 | McEneaney. | |
| 2,793,354 | 5/1957 | Heimbach | 339—198 |
| 3,001,171 | 9/1961 | Schultz | 339—217 |
| 3,118,716 | 1/1964 | Brellier | 339—217 |

FOREIGN PATENTS

| | | |
|---|---|---|
| 1,143,263 | 4/1957 | France. |

JOSEPH D. SEERS, *Primary Examiner.*

W. DONALD MILLER, *Examiner.*